Feb. 24, 1970 S. TESZNER 3,497,777

MULTICHANNEL FIELD-EFFECT SEMICONDUCTOR DEVICE

Filed June 11, 1968 8 Sheets-Sheet 1

INVENTOR:
STANISLAS TESZNER
By Abraham A. Saffitz
Attorney

INVENTOR:
STANISLAS TESZNER
By Abraham A. Saffitz
Attorney

Feb. 24, 1970 S. TESZNER 3,497,777

MULTICHANNEL FIELD-EFFECT SEMICONDUCTOR DEVICE

Filed June 11, 1968 8 Sheets-Sheet 3

INVENTOR:
STANISLAS TESZNER
BY Abraham A. Saffitz
Attorney

INVENTOR:
STANISLAS TESZNER
By Abraham A. Saffitz
Attorney

INVENTOR:
STANISLAS TESZNER
By Abraham A. Saffitz
Attorney

Feb. 24, 1970 S. TESZNER 3,497,777

MULTICHANNEL FIELD-EFFECT SEMICONDUCTOR DEVICE

Filed June 11, 1968 8 Sheets-Sheet 6

INVENTOR:
STANISLAS TESZNER
By Abraham A. Saffitz
Attorney

Feb. 24, 1970 S. TESZNER 3,497,777

MULTICHANNEL FIELD-EFFECT SEMICONDUCTOR DEVICE

Filed June 11, 1968 8 Sheets-Sheet 7

INVENTOR:
STANISLAS TESZNER
By Abraham A. Saffitz
Attorney

INVENTOR:
STANISLAS TESZNER
By Abraham A. Saffitz
Attorney

United States Patent Office 3,497,777

Patented Feb. 24, 1970

3,497,777

MULTICHANNEL FIELD-EFFECT SEMI-CONDUCTOR DEVICE

Stanislas Teszner, 49 Rue de la Tour, Paris, France

Filed June 11, 1968, Ser. No. 736,233

Claims priority, application France, June 13, 1967, 110,177; Oct. 17, 1967, 124,739; Nov. 30, 1967, 130,477; Mar. 21, 1968, 144,708

Int. Cl. H01l *11/00, 15/00, 7/00*

U.S. Cl. 317—235 11 Claims

ABSTRACT OF THE DISCLOSURE

An improvement to multichannel field-effect semi-conductor devices of the type comprising a substrate wafter of semiconductor material of a given type of conductivity, source and drain regions on the parallel major faces of the wafer, a diffused internal gate of the opposite type of conductivity, said gate including a perforated region defining conductive channels and a solid region, and a diffused superficial gate contact region superimposed on said internal solid region and in ohmic contact therewith. The improvement consists in providing as a part of said internal gate strip regions originating in the solid region and, as a part of said superficial gate contact region, super-ficial diffused regions superimposed on said strip regions.

This invention relates to improvements in field-effect semiconductor devices for use in amplifiers, oscillators or electronic switches having a drain electrode, a source electrode and at least one gate electrode, the latter being also called "control electrode" or "grid electrode." More precisely, the invention relates to those of such devices which include a wafer of semiconducting material of a given type of conductivity, a drain zone and a source zone in said wafe respectively adjacent to one and the other of the parallel major surfaces thereof, and a multi-channel connection between said zones consisting of a number of conductive channels passing through at least one gate or "grid body" made of the same semiconducting material but having the opposite type of conductivity to said given type of conductivity. These conductive channels are connected together at their extremities by layers of said semiconducting material having said given type of conductivity.

Devices of this kind are commonly called "gridistors"; they may be provided with one or two control grids. Although in the following the sole case of single-grid devices (solid state triodes) will be considered, it must be understood that the invention also applies to devices with two control grids (solid state tetrodes).

A device of the same kind has been described, for instance, in the U.S. Patent Ser. No. 3,274,461, issued Sept. 20, 1966.

It is known that the source and drain electrode contacts in such a structure are ohmic in the case of unipolar gridistors (with majority carriers) designed for low intensity current operation at high or very high freqencies, and are rectifying (with minority and majority carriers) in the case of bipolar gridistors designed for high intensitivity current opeation. These contacts are located on the already mentioned parallel major surfaces of the semi-conductive wafer forming the gridistors.

A control electrode contact, always ohmic, with the grid body must also be provided. It is formed inside the wafer by a diffusion and welding process, possibly after chemical or electrochemical etching of the wafer to uncover a suitable portion of the grid body.

Once the grid contact has been obtained, it is necessary that the resistance in the grid body between the contact point and the most remote conductor channel, which resistance hinders operation of the gridistor, be sufficiently low for the field effect to be applied almost simultaneously and without any appriciable delay to all the channels in the structure. Actually, for unipolar gridistors, the high risitance of the grid body and the capacitance of the structure for the signal applied between the grid and one of the other electrodes lead to a proportionally high charging time constant except in the case where if the dimensions of the structure are very small; this is likely to entail a considerable reduction in the high frequency performance of the device. In practice, it is desirable that this time constant be limited to the order of magnitude of $10^{-10}$ second.

In the case of bipolar gridistors, whose dimensions are necessarily relatively large, owing to the higher power to be controlled, the excessive resistance of the grid could hinder the rapid elimination of the carrier plasma from the channels, which elimination is absolutely necessary for the development of space charges therein; this elimination corresponds, in fact, to a grid current peak of very short duration (generally of the order of a fraction of a microsecond), but of quite considerable amplitude (of the order of about ten to several tens of amperes) which must be supplied with a relatively low grid control voltage (of the order of approximately ten or several tens of volts at most).

Furthermore, to obtain the best possible advantages from the structure of a gridistor, it is necessary that the part of the area allocated to the channels in the total area of the grid be as large as possible, therefore that the spacing between these channels be as small as possible. It follows therefrom that the specific resistance of the grid body will be necessarily and relatively high, even with the highest possible impurity concentration obtainable practically.

An apparent incompatibility will thus be noticed between the two fundamental conditions recalled hereabove: very low grid resistance large number of channels, with high channel density. The purpose of this invention is to remove this incompatibility.

The first object of the invention is to form structures where the density of chanels as well as the proportion of the total grid area taken up by them are raised to a practically obtainable maximum and where, nevertheless, the grid is substantially equipotential in relation to the potential of its feed point.

According to the invention, contact to the inner grid is made from the surface of the wafer forming the semi-conductor device by additional grid contact diffusion, not only throughout the length of a frame or in a central zone of the device, but also along strips or fingers, issuing from the frame and running inwards or from the central zone outwards, wherefrom, it results that the distance between any conductor channel and that part of the grid which is at the surface of the wafer is below a predetermined limit.

Efficient operation of an equipotential grid requires a satisfactory contact between the superficial part of the grid to which the grid electrode is soldered and the internal body of the grid; otherwise the grid resistance could be increased by a contact resistance higher than said grid resistance by one order of magnitude or even several orders of magnitude.

In planar gridistor construction where the grid contact is obtained by causing diffusion from a contact zone into the grid body, a strictly limited time is available to make this contact. As a matter of fact, it must be kept in mind that the structure of the grid originally formed by diffusion undergoes three extensions, one during epitaxial growth, the second during formation of the silica mask designed for forming the frame for making internal grid contact and the third during diffusion of this inner grid contact frame. These extensions result in a reduction of the diameter of channels and an increase in their length. If it is desired to keep the opening of channels which pass through the grid sufficiently large (which is required for a high value of the transconductance and also, in the case of power systems, for a relatively high value of the drain current) and also, if one wants to greatly reduce the length of channels in the grid, which is essential for devices that must operate at very high frequency, the diffusion time for making internal contact with the grid must be limited. This time is, of course, all the more limited, all things being equal, when the cross-section area of each mesh in the diffusion mask is smaller, a necessary condition for maximum channel density.

Another purpose of the invention is to insure a very satisfactory grid contact in a gridistor without impairing the structure of the grid.

According to the invention, assuming that the grid contact is obtained by diffusion of an impurity of the same type of conductivity as that of the grid in the thickness of the layer of opposite conductivity type which forms the source region, the said thickness is reduced by chemical etching at those places where the said diffusion must subsequently be carried out.

Alternatively, the grid contact may be produced by diffusion of an impurity belonging to the same group in the periodic classification of elements as the impurity used to form the grid but having a higher diffusion coefficient.

The invention will now be described in detail with reference to the attached drawings on which:

FIGS. 1 and 2 are, respectively, an elevation section along section line 1—1 of FIG. 2 and a plane section along section line 2—2 of FIG. 1, of a field effect, multichannel semiconductor device of a prior art model;

Figure 5:
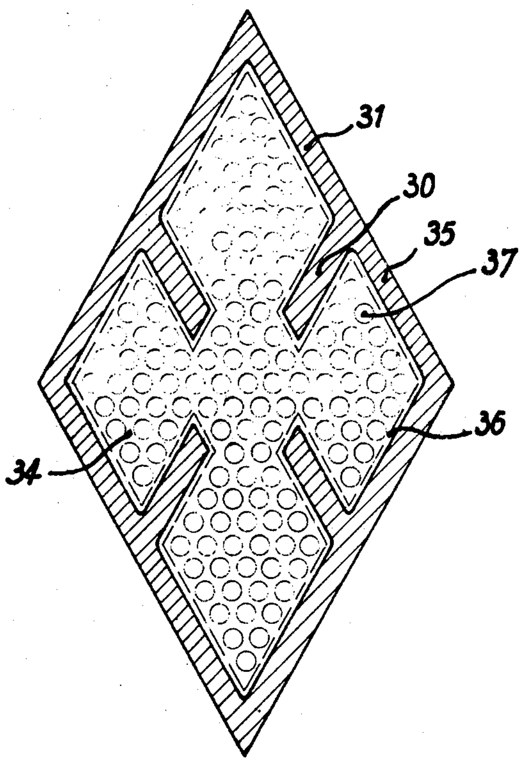
Figure 6:
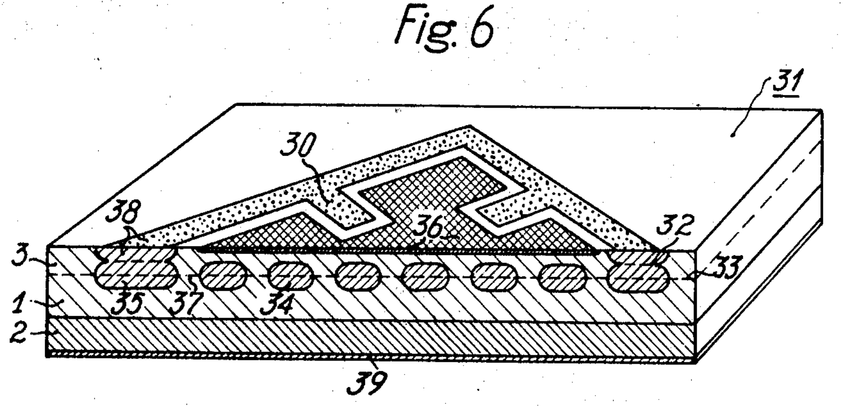
Figure 7:
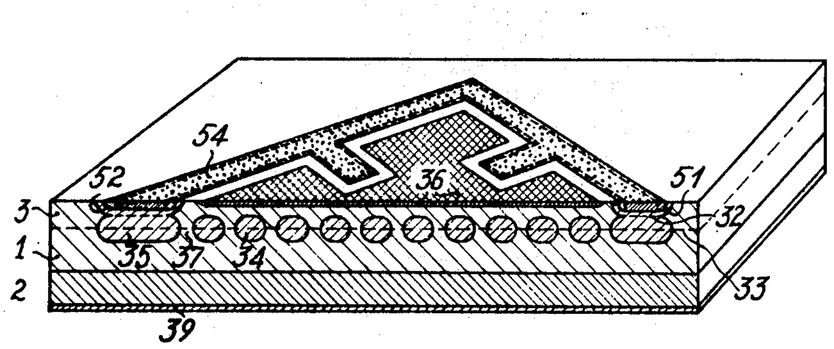
Figure 8:
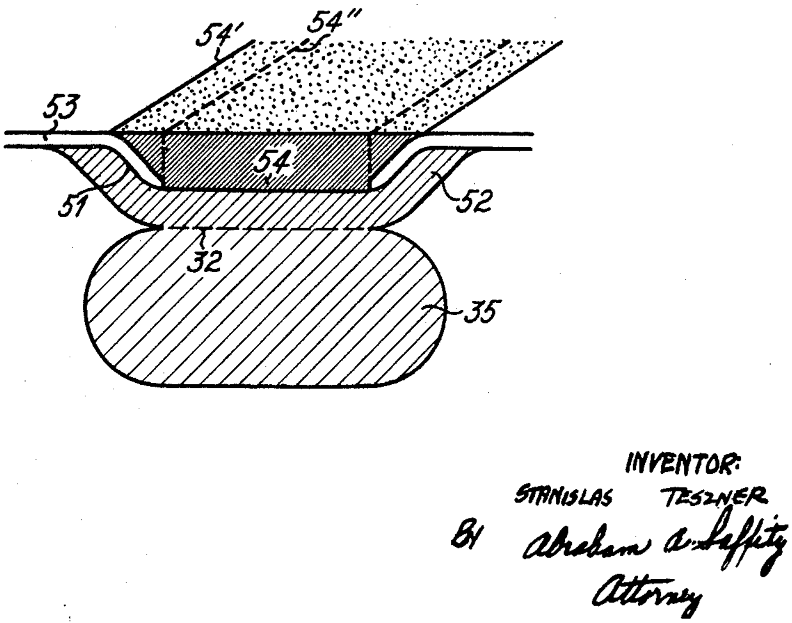
Figure 9:
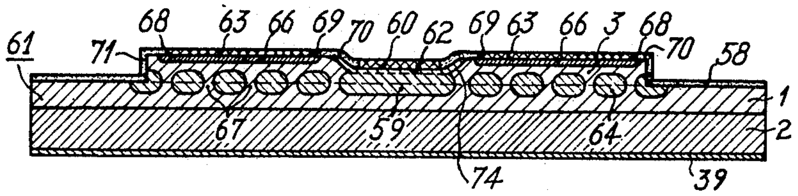
Figure 10:
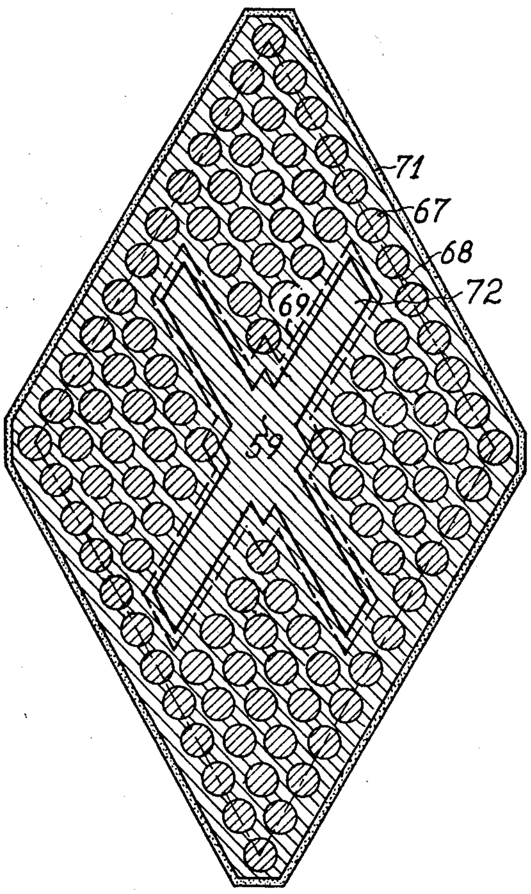
Figure 11:
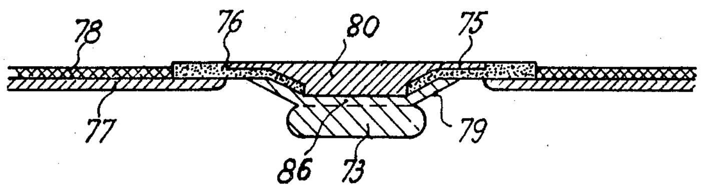
Figure 12:
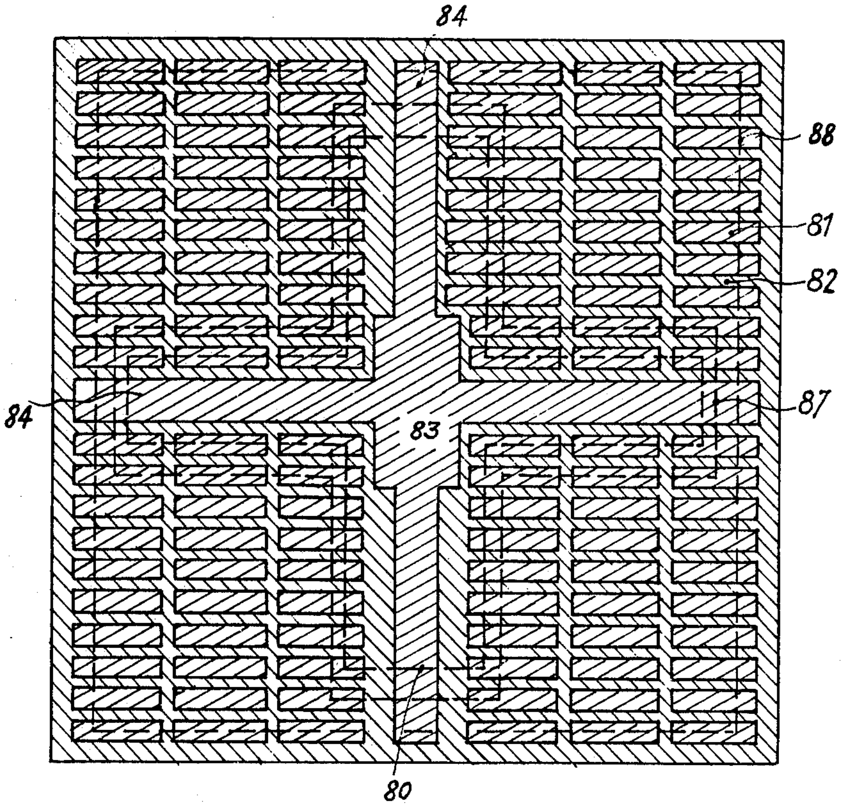
Figure 13:
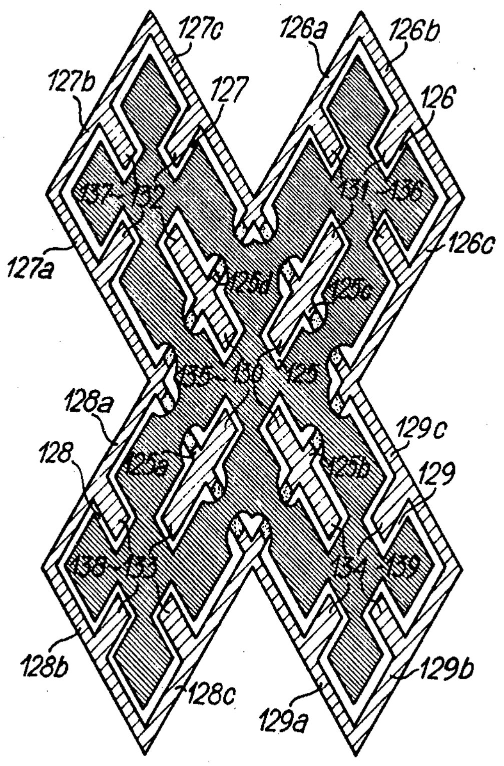
Figure 14:
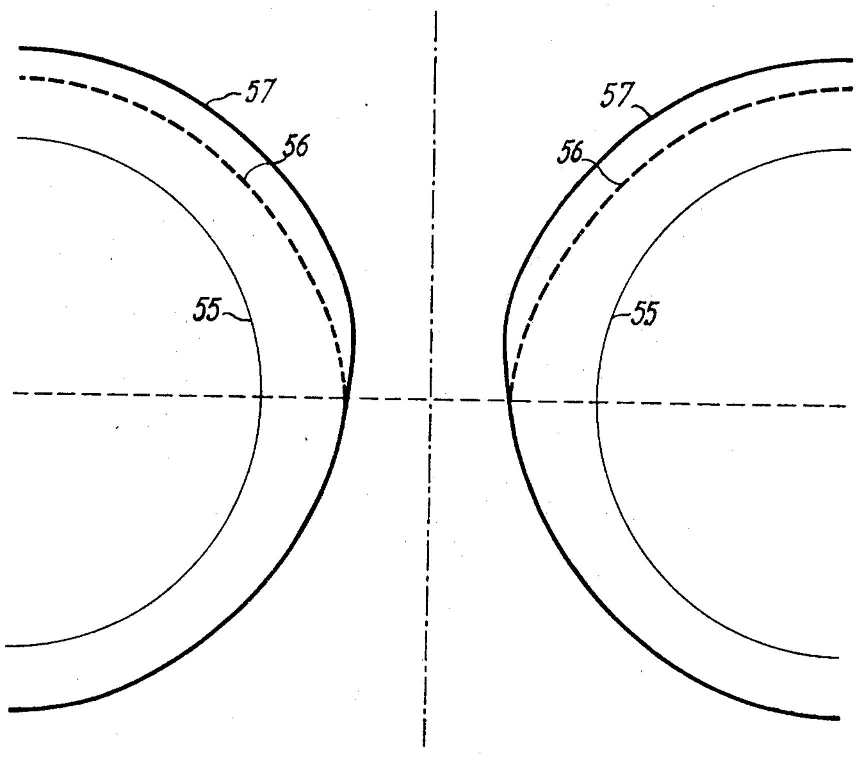
Figure 15:
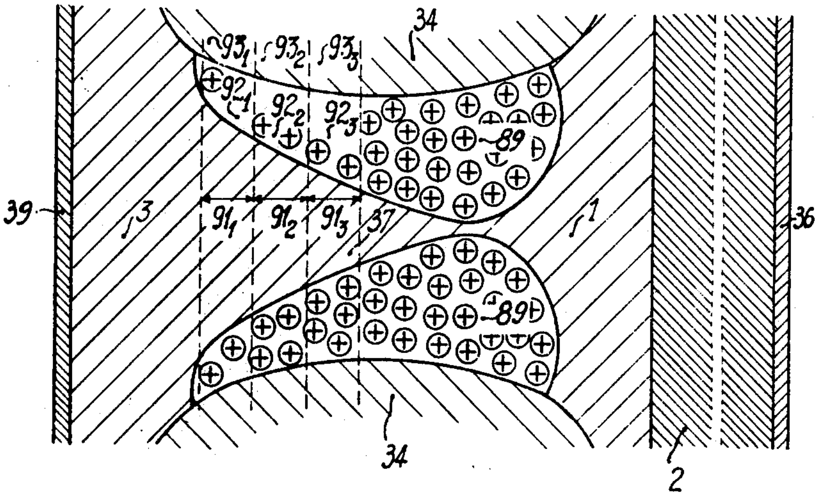
Figure 16:
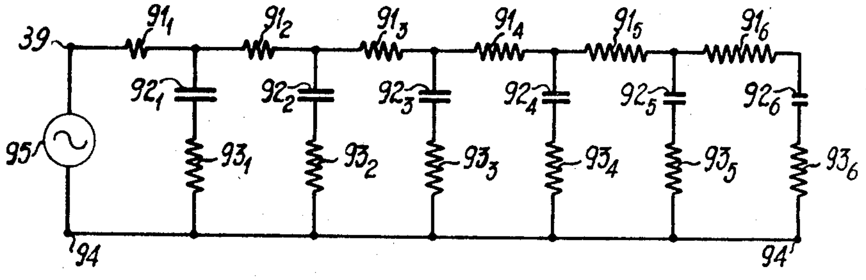

FIGS. 5 and 6, respectively, illustrate a plane section and an elevation section of another lozenge-shaped field effect multichannel device according to the invention;

FIG. 7 illustrates a field effect multichannel device similar to that shown in FIGS. 5 and 6, but with, furthermore, thinning down of the source layer near the peripheral frame of the grid;

FIG. 8 is an enlarged detail of the device on FIG. 7;

FIGS. 9 and 10, respectively, illustrate an elevation section and a plane section of a third field effect multichannel device in which the peripheral grid frame is replaced by a central zone;

FIG. 11 illustrates a detail of the device on FIGS. 9 and 10;

FIG. 12 represents a field effect multichannel semiconductor device with rectangular channels incorporating the characteristic features of the invention;

FIG. 13 illustrates a field effect multichannel semiconductor device according to the invention but with an increased surface; and FIGS. 14, 15 and 16 are figures helping to explain the operation of the semiconductor devices concerned by the invention, and, in particular, to explain the choice of the resistivities in the various layers of the semiconductor material forming them.

Figure 1:
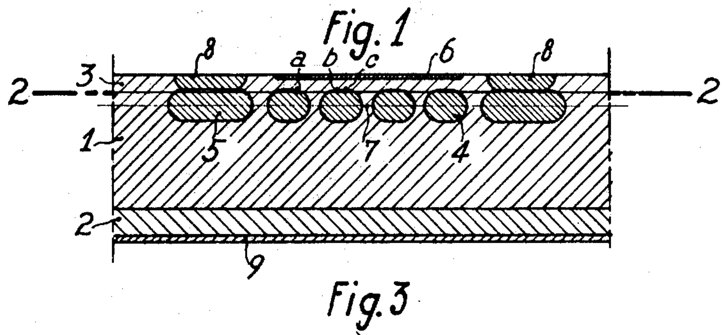

The structure on FIG. 1 is a suitably arranged transportation of FIG. 6 of U.S. Patent No. 3,274,461, issued Sept. 20, 1966, taken as an example of a prior art model of multichannel type field effect device. It consists of a wafer 1 made of n-type silicon in which one superficial layer 2 is heavily doped, i.e. is of the type $n^+$ in the case of unipolar gridistors. A drain electrode 9 is soldered to this layer. On the surface of layer 1 is formed a silica mask which has substantially the shape illustrated in FIG. 2 despite the fact that this figure also illustrates, as will be seen, a section of the structure through a plane marked 2—2 in FIG. 1. P-type diffusion is obtained through this mask so as to form the grid which includes the spaces between the channels and a peripheral frame. The mask includes circular areas 17 and an area 11 outside the perimeter of the structure. It prevents the diffusion from reaching these areas 17 which correspond to the openings of the channels, as well as surface 11 of the wafer outside the grid frame. Thus the diffusion area is limited to the gaps 14 between the channels and to the peripheral frame 15, where the grid contact will be formed. The oxide mask is then removed and an epitaxial layer 3 of a n-type silicon is grown; finally, through a new mask; an outer ring 8 of type $p^+$, making a $p^+$–$p$ junction with the grid frame, is diffused. This ring is then metallized so as to reduce its resistance to a minimum and it forms the grid contact. An $n^+$ heavily doped source layer 6 is then formed. In the case of unipolar gridistors the drain layer 9 is of $p^+$ type.

Figure 2:
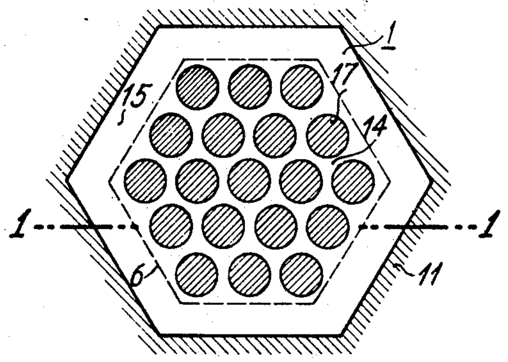

In FIG. 1 can be seen grid 4, frame 5, channels 7, layers 1 and 3 which connect the channels in parallel, the grid contact outer ring 8 and the source and drain electrodes 6 and 9. As stated at the beginning, the grid is expanded during the epitaxial growth, formation of the frame mask and diffusion of the frame contact. The result is that the diameter of a channel 7 at its center is smaller than the diameter of a circle 17 and that the width of a mesh 4 in the grid is greater than the width of a space 14. It can be stated that FIG. 2 is a plan view of the system when it is limited to the free surface of wafer 1 prior to removal of the oxide mask. It can be also stated, as already noted, that FIG. 2 is a cross-section of the device by plane 2—2 of FIG. 1 which passes through the channels in the proximity of their ends at the point where the latter have a diameter *ab* practically equal to that of a circle 17 and cut the meshes at the point where their width *bc* is equal to the width of a space 14.

Figure 3:
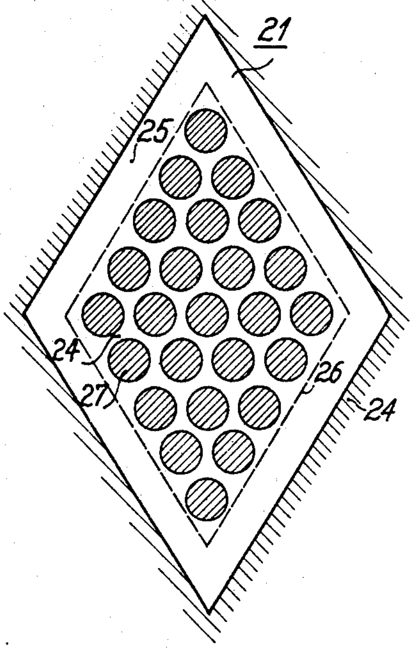
FIG. 3 is a plane section of a structure of the prior art.

Numerous alternatives concerning the geometry of this structure in the former model are possible, several types of which have been described in the above-mentioned U.S. patent, which alternatives include channels with a circular, square or rectangular section of any dimension and spacings. Whilst keeping, here, as an example, to the case of circular section channels, an illustration (FIG. 3) has been made of a semiconductor device with, in plane view, lozenge geometry. This geometry, whilst ensuring maximum density of channels, allows reduction of the grid drive time constant by reducing the distance from the central channel to the perimeter, subject to a slight reduction in the perimeter/area ratio of the structure. The semiconductor device is designated by 21. The openings of the channels are illustrated by hatched circles 27; the channel spaces are designated by 24, the grid frame by 25, finally, the surface outside the frame by 24. The contour of the $n^+$ source layer is illustrated by dotted line 26.

Nevertheless, this optimum utilization of the area does not obviate the necessity of increasing it when the power capacity of the system is to be increased. At this point. two solutions are offered: either to couple in parallel simple geometry structures in accordance with FIGS. 2 or 3 or else to obtain a single structure with an enlarged area with a suitable increase in the proportion of the area given over to channels out of the total area of the structure. This second solution is preferably but it has the disadvantage already mentioned at the beginning of rendering the equivalent resistance of the grid body excessive since certain channels are relatively far from the grid contact.

This invention offers a means of remedying this by introducing, in the grid body, low resistance strips originating from, or in ohmic contact with, the peripheral frame of, more generally, with the grid contact. These strips are integrated in the grid body or are at least in ohmic contact with this body. The structure of hexagonal shape 41 on FIG. 4 consists of a frame 45, which is hatched on the drawing, to which is attached the grid contact not shown on the drawing. Six strips 40 originate from this frame and leave the corners towards the center of the hexagon. These strips form part of the grid in the same manner as frome 45; they considerably reduce the distance separating the farthest channel from the grid bias electrode. The $n^+$ source layer must, of course, by-pass these strips; its contour 46 is illustrated by a dotted line on FIG. 4. In the same manner as the peripheral frame, the strips should be preferably brought to the surface by diffusion, then metallized.

In the case of lozenge geometry which, for the same area, leads to a smaller channel-grid electrode maximum distance, it is possible to limit the system to four strips 30 as illustrated on FIGS. 5 and 6.

By referring to FIG. 6, the semiconductor system according to the invention consists of a n-type silicon wafer 1 of which one layer 2 is $n+$ heavily doped and covered with a metal drain electrode 39. Wafer 1 is surmounted by a layer 3 formed by epitaxial deposition. Semiconductor p-type grid 34 carriers a frame 35 and limits channels 37. This frame is brought to the surface by a superficial diffused frame 38 with four strips 30 directed inwards. Like the frame, strips 30 carry an internal part similar to 35 and a superficial part similar to 38. The heavily doped and metallized source zone is shown at 36.

Figure 4:
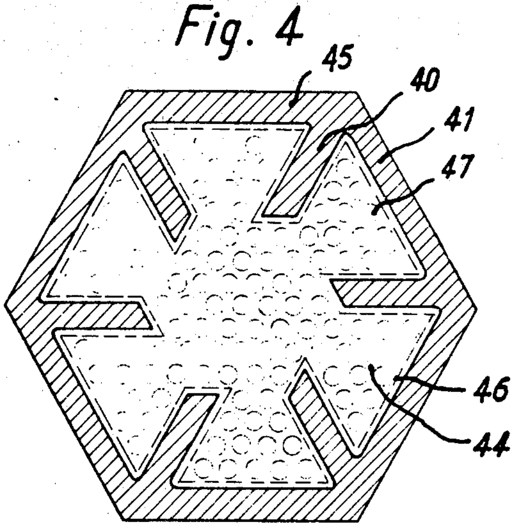
FIG. 4 is a plane section of a first field effect, multichannel device of hexagonal shape according to the invention.

Relative to former field effect multichannel semiconductor devices, and for an area allocated to channels similar in both cases the structures on FIGS. 4 to 6 allow a reduction in the grid resistance by a ratio of 4 to 6.

The manufacture of the frame and the superficial sensors surmounting the frame and the internal strips raises difficulties since it is necessary that the superficial frame and the internal frame and the superficial arms and internal strips be in ohmic contact in plane 32 of FIG. 6. To bring out these difficulties, the manufacturing method of the system shown on FIGS. 5 and 6 is recalled hereafter.

The element selected to form the diffusion grid (boron for example) is first deposited and prediffused through the orifices of an oxide mask previously formed on the free surface of layer 1, represented by the broken line 33. After removal of the oxide film, the epitaxial layer 3 is grown and during this operation, the prediffused grid will expand on both sides of plane 33. After this operation, the formation of frame 38 is conducted by diffusing an element of the same group III as for the grid (preferably also boron), through the orifices of a mask formed on the free surface of layer 3. Finally, an element of group V (phosphorous, for example), is diffused to form source heavily source doped layer 36.

The difficulty of this manufacturing method stems from the fact that diffusion of the grid continues during all subsequent diffusion operations, thereby limiting the time available for diffusion of frame 38 and strips 30, or else the section of channels 37 in the grid, at the same time as the distance between the top of the grid and source layer 36 will be greatly reduced. To avoid this risk, it is necessary, firstly, to increase the distance between mask orifices used for diffusion of the grid, thereby limiting the obtainable channel density, secondly, to increase the thickness of the layer 3, thereby increasing the diffusion time of frame 38 and, consequently, that of the grid. This results in an increase in the length of channels 37 reducing the limiting operational frequency and a reduction in their section, thereby reducing the transconductanco and drain current.

This difficulty may be overcome by profiling layer 3 and reducing the thickness of this layer at the places where frame 38 and strips 30 must be diffused. This profiling is illustrated in detail on FIG. 8 and, integrated in the structure as a whole, is shown on FIG. 7. The components on FIG. 7, which are similar to those on FIG. 6, are designated by the same reference numbers. Thus, the heavily doped substrate 2, for example $n^+$, the n-type layer above substrate 2, the epitaxial layer 3, of same type, p-type grid 34 limiting channels 37 and its frame 35 diffused on both sides of plane 33, upper frame 52 formed by diffusion in such a manner as to come into intimate contact with frame 35 along interpenetration surface 32 and heavily doped $n^+$ type source film 36 can be seen.

The essential difference in the structure shown on FIG. 7 relative to the gridistor shown on FIG. 6, is that the opitaxial layer 3 is etched along the profile of frame 35, with a groove 51, considerably reducing the diffusion depth necessary for frame 52 until its penetration into frame 35.

The reduction in the total diffusion time of the grid resulting therefrom procures the double advantage of allowing a very substantial increase in the density of channels and, consequently, of the figure of merit of the device and of reducing the length of the channels practically by half, from which it can result that the intrinsic operational limiting frequency of a gridistor built according to FIG. 7 can reach twice the value of that of a gridistor built according to FIG. 6 with, in other respect, the same specifications.

FIG. 8 shows groove 51 in detail to facilitate the description of its manufacturing methods. This groove is chemically etched through the orifices of the oxide mask prepared for diffusion of frame 52. Once these orifices have been uncovered by dissolving the silica mask by chemical etching, for example with hydrofluoric acid, along the profile of frame 52, the layer 3 is etched down to a relatively low depth (generally of the order of 1 to 3 microns), with an appropriate chemical bath, for example such as the product known as CP.-4A which consists of nitric acid, hydrofluoric acid and acetic acid in a proportion of 5:3:3. The diffusion of frame 52 is then conducted so that it comes into intimate contact with grid frame 35, then the source 36 heavily doped layer is formed in accordance with usual diffusion techniques through a suitable mask. Finally, to delimit the metallization contours of frame 52, a new oxide mask 53 is formed which remains and leaves the bottom of groove 51 uncovered and where a metal film 54 is deposited which superficially alloys itself by micro-diffusion with frame 52. Double lines 54' (full line) and 54'' (dotted line) shown on the metallization surface 54 respectively designate its outer limit and the limit of its central part superficially alloyed with the diffused film 52.

Another process for reducing the formation time of frame 38 consists in diffusing, to form the latter, an element of the same group in the periodic classification as the element used to form the grid, but differing by a higher diffusion coefficient. If the impurity used to form the grid is boron, frame 38 can be formed, particularly, by diffusing aluminum, thereby making it possible to obtain it four to five times faster than with boron. This solution is not, however, as radical as the foregoing and, furthermore, it is beset with certain disadvantages because, in the present state of techniques, the oxide film does not appear to be as impervious to the diffusion of aluminum as to the diffusion of boron.

The systems shown in FIGS. 4, 5 and 6 include a peripheral frame, to separate the source area from the drain area. This frame has, relative to the drain electrode, the disadvantage of introducing a parasitic capacity. FIGS. 9 and 10 show a system in conformity with the invention but without a frame.

Structure 61 is built, as that of FIG. 7, by a substrate 1 made out of n-type, silicon for example, in which a superficial film 2 is $n^+$ heavily doped; on this film is soldered drain electrode 39. Layer 1 is surmounted by an epitaxial layer 3 made out also of n-type silicon. However, contrary to the case shown on FIG. 7, layer 3 is deposited, not on the entire surface of layer 1, but on the part of this surface delimited by an insulating mask 58, for example made out of silica, slightly penetrating into the periphery of grid 64, so that the latter separates the source area from the drain area, which only communicate through the channels such as 67.

Diffused grid 64 includes a solid central area 59 and radiating strips 72.

Grid contact making takes place on the central zone 59 and strips 72, which are preferably and previously etched in the form of a bowl as shown at 74 by chemical or electrolytic etching through an adequate mask, into which bowl there is diffused a film 62 of an element of group III such as boron, forming a p-type impurity, until penetration into central area 59 of the grid body. Bowl 74 is covered with a metal film 60, for example aluminum, which is superficially alloyed, by micro-diffusion, with the underlying silicon and which is designed to receive a non-illustrated grid electrode by soldering.

The structure is completed by diffusion of a n-type impurity forming an $n^+$ source layer 66, which is also metallized at 63 for soldering the non-illustrated source electrode. The outer and inner edges of the annular heavily doped layer 66 are respectively designated by reference numbers 68 and 69. Finally, an oxide mask 70 protects the unmetallized surface and also covers, at 71, the perimeter of epitaxial layer 3.

FIG. 10 shows a section of this structure along the plane at the top of the grid, as on FIG. 5 these two drawings being substantially to the same scale so as to enable simple comparison of corresponding areas. On this figure, which is limited by the oxide film 71 surrounding epitaxial layer 3, the heavily doped source layer is not visible, but its contours are shown by broken lines 68 and 69.

The lozenge shaped central area 59 and strips 72 result in a loss of a few channels. To compensate for this loss, the area occupied by the channels must be increased by that of the channels located in the region occupied by the frame in the system shown on FIG. 5. Thus for the same useful area, the total area bounded by the oxide film 71 is approximately 25% less than that in the structure shown on FIG. 5. This corresponds, consequently, to an increase of approximately 30% in the ratio of the useful area to the total area of the structure, that is to say its factor of efficiency.

It could be of advantage for small structures with highly dense channels to even reduce the small loss in useful area resulting from central area 59. A solution to this problem is given on FIG. 11 which shows the central portion of the structure to a larger scale.

With a central cavity 79 etched in the surface of the structure as in the case of FIG. 9, and an impurity of same type of conductivity, p-type for example, as that of the grid, diffused throughout the bottom of the cavity 79 until penetration in the cenrtal area 73 of the grid body, the edges and the contour of the cavity 79 are covered with an insulating film 75 made out of silica in which a housing 76 concentric with cavity 79 and larger than it is formed. The entire inside of housing 76, including its central part in contact with area 73, is then metallized and the grid electrode contact is obtained by soldering on the metallic film 80 thus obtained. It is thus possible to minimize the loss in useful surface whilst retaining a sufficient contact surface for the soldering of the grid electrode. Furthermore, there is also an increase in the surface area of the heavily doped source layer 77, on top of which is the metal film 78 which has an area more than sufficient to solder the corresponding electrode.

The configurations of the gridistor structures in accordance with the invention area, of course, applicable whatever be the geometrical shape of the grid. Thus, the channels can not only have a circular section, but also an oval, or square, or rectangular, or polygonal section. FIG. 12 shows a section view along the plane at the top of the grid of the structure consisting of channels 81 of n-type with rectangular sections surrounded by a grid 82 of p-type. This grid includes a central grid body section 83 and two branches 84. On top of the central section 83 and branches 84 is a p-type semiconductor layer 86, then a metal film 80 against it and extending above the oxide film as shown on FIG. 11, on a larger scale than that of FIG. 12. Finally, the frames 87 and 88 shown by broken lines, represent the annular contour of the $n^+$ film of source 77.

The system on FIG. 13 is formed by placing side by side, five lozenges of the type shown in FIGS. 5 and 6, with the difference that only the central lozenges 125 includes a frame with four sides, whereas the four peripheral lozenges 126, 127, 128 and 129 only include frames with a lacking side. In this case, it will be noticed that the sides of the frame of lozenge 125 form, in fact, transversal strips 125*a, b, c*, to feed the grid of this structure. The effect of these transversal strips is added to that of the peripheral leads formed by the sides of the frames of the peripheral logenzes 126*a, b, c*, 127*a, b, c*, 128*a, b, c*, 129*a, b, c*, as well as that of strips 130, 131, 132, 133, 134.

The connections between the source films of the five lozenges forming the structure are assured by metallization on top of the silica film. These source surfaces have been illustrated by finely hatched surfaces 135, 136, 137, 138 and 139 connected together. Coarser hatching represents the metallization covering the peripheral frame-lead of lozenges 126 to 129, strips 131 to 134 of the side logenzes, the peripheral frame-lead of central frame 125 and strips 130 of the latter. It will be noticed that the metallization of the frame and the strips is cut to allow the links between the source surfaces 135 to 139 to pass. Nevertheless, the continuity of these leads is assured by diffused bands covered by the silica and shown tinted in grey to the extent visible on FIG. 13.

The main dimensional and electrical characteristics of unipolar and bipolar gridistor models, according to FIG. 13, are given hereafter for information purposes.

(A)—UNIPOLAR GRIDISTOR FOR VERY HIGH FREQUENCY AMPLIFICATION

| | |
|---|---|
| Area | 0.5 mm.$^2$. |
| Diameter of channel at throttled section | ≈2μ., |
| Center to center distance of channels | ≈7μ. |
| Number of channels | ≈10,000. |
| Thickness of grid | ≈4μ. |
| Drain current | ≈1a. |
| Transconductance | ≈0.5 mho. |
| Figure of merit | ≈1 gHz. |
| Amplifier output power, class & at 1 gHz. | ≈5 w. |

(B)—BIPOLAR GRIDISTOR FOR HIGH POWER SWITCHING

| | |
|---|---|
| Area | 2 cm.$^2$. |
| Diameter of channel at throttled section | ≈20μ. |
| Center to center distance of channels | ≈100μ. |
| Number of channels | ≈20,000 |
| Thickness of grid | ≈30μ. |
| Grid blocking voltage | ≈10 v. |
| Drain current rating | ≈200 a. |
| Current breaking capacity | ≈200 a. |
| Duration of process | <10μs. |
| Maximum operating voltage | 500 v. |
| Maximum voltage applicable in the blocking state | 1000 v. |

These two models can be manufactured by the previously mentioned technologies consisting of diffusion and epitaxial growth; by giving a finer definition to the grid, it is possible to further improve perfromance. In other respects, by applying more recent techniques now being developed, particularly doping of semiconductor by ionic bombardment, localized by means of a very high definition ionic mask, which technique is known as ions implantation, even higher performance can be attained without exceeding the scope of the invention.

The respective resistivities of substrate 1 and epitaxial layer 3 will now be discussed.

In all the examples of gridistors that have been given above, the drain region is formed in the substrate and the source region in the epitaxial layer. To reduce the source-grid capacitance in this case, it is of advantage to select a higher resistivity for the epitaxial layer 3 than for the substrate 1. For example, for the substrate a resistivity 2 ohms-cms. can be taken and for the epitaxial layer a resistivity of 4 to 6 ohm-cms.

Two consequences result from this. Firstly, the grid-source capacitance is significantly reduced since it is almost inversely proportional to the square root of the resistivity. Secondly, the saturation characteristic of the current is improved and FIG. 14 explains this apparently surprising consequence. In actual fact, although it is quite exact that this hardly changes the diffusion profile of the grid, on the other hand the profile of the channels is quite considerably modified due to the depletion space developed at the p-n junction between the grid and the channel. This is shown by the curves in FIG. 14, in a particular case characterized by the following parameters:

Resistivity of the substrate: 1 ohm-cm.
Resistivity of the epitaxial layer: 2.5 ohm-cms.
Theoretical diameter of the channel: 2$\mu$
Thickness of the grid: 3$\mu$ In FIG. 14, the two half-circles in thin lines 55 show the thoretical profile of the channel in a plane passing through its axis when the depletion layer is cancelled out by opposite biasing of the grid compensating the potential barrier of the junction; this is a circular profile. The heavy line curve 57 shows the profile in the absence of any biasing, account being taken of the natural depletion spaces of the p-n junction in the case of the epitaxial layer resistivity being higher than the substrate resistivity. Finally, broken line 56, for the portion of the channel located in the epitaxial layer, corresponds to the case where resistivity of this layer would be equal to that of the substrate. This makes it possible to appreciate the improvement obtained. It can thus be seen that, whereas in the latter case (same resistivities on both sides of the line separating the epitaxial layer and the substrate), the profile of the channel is rapidly flared on both sides, thereby impeding the drain current saturation process, in the case according to the invention (curve 57), the profile becomes much more similar to a truncated cone with a relatively small angle at the tip, the advantages of which are disclosed in U.S. Patent No. 2,939,057 issued May 31, 1960 to the present applicant.

It can however be interesting, as will be shown, to simultaneously invert the locations of the source and drain electrodes, as well as the resistivity values of the layers (epitaxial layer and substrate) adjacent to these two electrodes. This will be shown in relation to FIGS. 15 and 16.

FIG. 15 shows the typical profile of an elementary channel 37 running from source 39 to drain 36 and surrounded by a grid mesh 34. The depletion space 89 delimiting the profile of the channel is developed by the field-effect produced by the voltage applied between source 39 and drain 36 and then between grid mesh 34 and drain 36, the grid being assumed to be directly connected to the source.

Such a structure can be represented, essentially, by the equivalent diagram in FIG. 16 where:

Resistors $91_1$, $91_2$, $91_3$, $91_4$, $91_5$, $91_6$ are resistors distributed along the entire length of channel 37, with values increasing from the source extremity to the drain extremity as a result of throttling in the channel section, this increase of the resistance per unit length being further and considerably accentuated by the reduction in the mobility of the charge carriers as a function of the electrical field strength in the portions of the channel where the field strength exceeds the so-called critical value; -capacitors $92_1$, $92_2$, $92_3$, $92_4$, $92_5$, $92_6$ are distributed capacitors due to the depletion layer 89 between grid mesh 34 and channel 37 with, on the contrary, values decreasing from the source extremity to the drain extremity:

Resistors in series $93_1$, $93_2$, $93_3$, $93_4$, $93_5$, $93_6$ represent the distributed resistance of the grid body between the grid contact through which the grid is biased and the portion of the channel under consideration. These resistors represent the resistances of grid sections from the source extremity to the drain extremity as shown in FIG. 15.

The signal source applied between the source 39 and the grid contact 94, upstream the grid body resistance, is designated by 95.

By examining the diagram in FIG. 16, it will be noticed that, to reduce the effect of the time constant on the signal applied between grid and source, with given resistors 91 and capacitors 92, an attempt must be made, certainly not exclusively, but particularly to reduce the parasitic resistances $93_1$, $93_2$ . . . on the flared part of the channel, since they are associated with capacitors $92_1$, $92_2$ . . . which are of relatively high capacity value and resistors $91_1$, $91_2$ . . . which are of relatively low resistance value.

Now, in the present state of manufacturing techniques for gridistor structures, the grid is first diffused into substrate 1, with continuous supply from an external source of the diffusing element; then the impurities thus accumulated are redistributed by heat treatment, without any further supply of the diffusing element, both in layer 3 and substrate 1. The volume of impurities previously accumulated in substrate 1 then plays the part of an internal source of diffusing element and it can easily be understood that the resistance of the grid embedded in the substate is necessary less than that of the part of the grid diffused into layer 3.

It is possible to deduce, from this, the advantage that can be obtained from locating the source region in substrate 1 and, correlatively, the drain region in layer 3, particularly in the case of structures with fairly large areas in high-frequency gridistores, and, this being, to make the resistivity of substrate 1 at least equal to, and preferably higher than that of layer 3.

It must be well understood that the above-described shapes, materials and manufacturing processes used to explain the invention, as well as the proposed methods of using the resulting products, have been selected by way of example and could be modified to a large extent without exceeding the scope of the invention.

What I claim is:

1. A multichannel field-effect semiconductor device comprising a substrate wafer of semiconductor material of a given type of conductivity, having source and drain regions on its parallel major faces, a diffused internal grid of the opposite type to said given type of conductivity and bounding a number of conductive channels, said grid including a perforated region defining conductive channels transverse thereto, a solid region and strip regions both devoid of conductive channels, said strip regions extending from said solid region, and a diffused superficial grid contact region of said opposite type of conductivity, disposed above said internal solid and strip regions and in ohmic contact therewith, said strip regions causing said perforated region of said grid to be substantially equipotential.

2. A multichannel field-effect semiconductor device as set forth in claim 1 in which said internal grid solid region and said superficial grid contact region disposed thereabove have the shape of a peripheral frame separating said source and drain regions, and in which said internal gate strip regions and said superficial grid contact region are on the internal side of said frame.

3. A multichannel field-effect semiconductor device as set forth in claim 1 in which said internal grid solid region and said superficial contact region form an area substantially at the center of said wafer, and in which said internal strip regions and superficial grid contact regions extend towards the outside of said central area.

4. A multichannel field-effect semiconductor device as set forth in claim 1 in which one at least of said source and drain regions is an epitaxially grown region and in which said perforated region, solid region and strip regions of said internal grid are diffused regions located partially in said substrate wafer and partially in said epitaxially grown region.

5. A multichannel field-effect semiconductor device comprising a substrate wafer of semiconductor material of a given type of conductivity and a layer of same said type of conductivity epitaxially grown onto said wafer, source and drain regions on the parallel major faces of said wafer and epitaxially grown layer, a diffused internal grid of the opposite type to said given type of conductivity, said grid including a perforated region defining conductive channels transverse thereto, a solid region and strip regions both devoid of conductive channels, said strip regions extending from said solid region, the thickness of said epitaxially grown layer being reduced in the portions thereof located above said grid solid and strip regions, and a superficial grid contact region of said opposite type of conductivity, diffused into the portions of said epitaxially grown layer of reduced thickness and in ohmic contact therewith, said strip regions causing said perforated region to be substantially equipotential.

6. A multichannel field-effect semiconductor device as set forth in claim 1 in which said source and drain regions are coated with a metallized layer.

7. A multichannel field-effect semiconductor device as set forth in claim 1 in which said diffused superficial grid contact region disposed above said internal solid and strip regions is coated with a metallized layer.

8. A multichannel field-effect semiconductor device as set forth in claim 1 in which said diffused superficial grid contact region disposed above said internal solid and strip regions is coated with an insulating film on a part of its surface, the part of latter said surface not coated with said insulating film and said insulating film itself being coated with a metallized layer.

9. A multichannel field-effect semiconductor device as set forth in claim 5 in which said epitaxially grown layer is said source region and in which said drain region is adjacent a major face of said wafer and the resistivity of said epitaxially grown region is higher than the resistivity of said substrate wafer

10. A multichannel field-effect semiconductor device as set forth in claim 5 in which said epitaxially grown layer is said drain region and in which said source region is adjacent a major face of said wafer and the resistivity of said epitaxially grown region is less than the resistivity of said substrate wafer.

11. A multichannel field-effect semiconductor device comprising a substrate wafer of semiconductor material of a given type of conductivity, source and drain regions on the parallel major faces of said wafer, a diffused internal grid of the opposite type to said given type of conductivity, said grid including a perforated region defining conductive channels transverse thereto and a solid region devoid of conductive channels located substantially at the center of said wafer, a diffused superficial grid contact region of said opposite type of conductivity, disposed above said internal grid solid region and in ohmic contact therewith and an insulating layer disposed in the plane of said grid and surrounding it, said insulating layer preventing any short-circuit path between said source and drain regions.

References Cited

UNITED STATES PATENTS 3,381,187 1/1968 Zuleeg ............. 317—235

JERRY D. CRAIG, Primary Examiner

U.S. Cl. X.R.

148—1.5